(12) United States Patent
Chung

(10) Patent No.: US 7,515,643 B2
(45) Date of Patent: Apr. 7, 2009

(54) MODULATION FOR BROADCASTING FROM MULTIPLE TRANSMITTERS

(75) Inventor: Sae-Young Chung, Tewksbury, MA (US)

(73) Assignee: Airvana, Inc., Chelmsford, MA (US)

( * ) Notice: Subject to any disclaimer, the term of this patent is extended or adjusted under 35 U.S.C. 154(b) by 721 days.

(21) Appl. No.: 10/954,705

(22) Filed: Sep. 30, 2004

(65) Prior Publication Data

US 2006/0067422 A1    Mar. 30, 2006

(51) Int. Cl.
H04L 7/02    (2006.01)

(52) U.S. Cl. .................. 375/267; 375/299; 455/101

(58) Field of Classification Search ............ 375/267, 375/299; 455/101
See application file for complete search history.

(56) References Cited

U.S. PATENT DOCUMENTS

| | | | |
|---|---|---|---|
| 5,309,474 A * | 5/1994 | Gilhousen et al. | 370/209 |
| 6,377,636 B1 * | 4/2002 | Paulraj et al. | 375/346 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,834,043 B1 * | 12/2004 | Vook et al. | 370/310 |
| 7,050,419 B2 * | 5/2006 | Azenkot et al. | 370/347 |
| 7,058,407 B2 * | 6/2006 | Chi et al. | 455/449 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0051499 A1 * | 5/2002 | Cameron et al. | 375/295 |
| 2002/0057663 A1 * | 5/2002 | Lim | 370/338 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |

(Continued)

OTHER PUBLICATIONS

Zhang, "Turbo Coding for Transmission over ADSL" ICCT200 Aug. 21-24, 2000.*

(Continued)

Primary Examiner—Juan A Torres
(74) Attorney, Agent, or Firm—Fish & Richardson P.C.

(57) ABSTRACT

In a cellular network, randomness is introduced into a transmitted signal at each transmitter, and the resulting received signal, which is the sum of all received signals, fluctuates more in time than a signal transmitted without the introduced randomness. While the introduction of randomness can diminish reception of some parts of the signal at the receiver, the transmitted signal can be encoded using forward error correction coding techniques, which allows the receiver to recover all of the signal information despite some diminished reception. Such randomization provides time diversity so that receivers can have more consistent performance. For broadcasted data, where users with the worst channel condition dictates the overall performance, having consistent performance across users can improve the overall network performance.

41 Claims, 5 Drawing Sheets

U.S. PATENT DOCUMENTS

| | | |
|---|---|---|
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |

OTHER PUBLICATIONS

TSG SA WG1 BC/MC adhoc, "Proposed changes to the requirements of Multicast and enhanced Broadcast services", tdoc S1-BM-010007 Newbury, UK, Jul. 2-3, 2001).*

"CDMA2000 High Rate Packet Data Air Interface Specification," 3GPP2 C.S0024, version 2, Oct. 27, 2000, 441 pages.

R. Knopp and P. A. Humblet, "Information capacity and power control in a single cell multi-user communications," Proceedings of (ICC) International Conference on Communications, Seattle, WA, pp. 331-335, Jun. 1995.

TIA/EIA/IS-856, 3rd Generation Partnership Project 2 "3GPP2" C.S0024-A, "cdma2000, High Rate Packet Data Air Interference Specification", version 2.0, Jul. 2005, 1227 pages.

TIA/EIA/IS-856, 3rd Generation Partnership Project 2 "3GPP2" C.S0024-A, "cdma2000, High Rate Packet Data Air Interference Specification", version 2.0, Oct. 27, 2000, 441 pages.

3rd Generation Partnership Project "3GPP2", "Inoperability Specification (IOS) for Broadcast Multicast Services (BCMCS)", A.S.0019-0, version 1.0, 3GPP2 Publication Version, Nov. 2004 (110 pages).

3rd Generation Partnership Project "3GPP2", "CDMA2000 High Rate Broadcast Packet Data Air Interface Specification", C.S0054-0, version 2.0, Jul. 2005 (105 pages).

3rd Generation Partnership Project "3GPP2", "CDMA2000 High Rate Broadcast Packet Data Air Interface Specification", C.S0054-0, version 1.0, Jul. 2005 (101 pages).

3rd Generation Partnership Project "3GPP2", "CDMA2000 High Rate Broadcast Packet Data Air Interface Specification", C.S0054-A, version 1.0, Feb. 14, 2006 (169 pages).

3rd Generation Partnership Project "3GPP2", "Broadcast Multicast Service for CDMA2000 1x Systems", C.S0077-0, version 1.0, Apr. 2006 (18 pages).

3rd Generation Partnership Project "3GPP2", "Broadcast Multicast Service for cdma2000 Wireless IP Network", X.S0022-A, version 1.0, Revision A, Feb. 16, 2007 (143 pages).

3rd Generation Partnership Project "3GPP2", "Introduction to cdma2000 Spread Spectrum Systems", C.S0001-D, version 1.0, Revision D, Feb. 2004 (18 pages).

3rd Generation Partnership Project "3GPP2", "Introduction to cdma2000 Spread Spectrum Systems", C.S0001-D, version 1.0, Revision D, Feb. 2004 (18 pages).

3rd Generation Partnership Project "3GPP2", "Physical Layer Standard for cdma2000 Spread Spectrum Systems", C.S0002-D, version 1.0, Revision D, Feb. 13, 2004 (526 pages).

3rd Generation Partnership Project "3GPP2", "Physical Layer Standard for cdma2000 Spread Spectrum Systems", C.S0002-D, version 2.0, Revision D, Sep. 2004 (526 pages).

3rd Generation Partnership Project "3GPP2", "Medium Access Control (MAC) Standard for cdma2000 Spread Spectrum Systems", C.S0003-D, version 1.0, Release D, Feb. 13, 2004 (254 pages).

3rd Generation Partnership Project "3GPP2", "Medium Access Control (MAC) Standard for cdma2000 Spread Spectrum Systems", C.S0003-D, version 2.0, Release D, Feb. 13, 2004 (264 pages).

3rd Generation Partnership Project "3GPP2", "Signaling Link Access Control (LAC) Standard for cdma2000 Spread Spectrum Systems", C.S0004-D, version 1.0, Release D, Feb. 13, 2004 (264 pages).

3rd Generation Partnership Project "3GPP2", "Signaling Link Access Control (LAC) Standard for cdma2000 Spread Spectrum Systems", C.S0004-D, version 2.0, Release D, Sep. 2005 (264 pages).

3rd Generation Partnership Project "3GPP2", "Upper Layer (Layer 3) Signaling Standard for cdma2000 Spread Spectrum Systems", C.S0005-D, version 1.0, Release D, Feb. 2004 (2247 pages).

3rd Generation Partnership Project "3GPP2", "Upper Layer (Layer 3) Signaling Standard for cdma2000 Spread Spectrum Systems", C.S0005-D, version 2.0, Release D, Sep. 2004 (2367 pages).

* cited by examiner

MODULATION FOR BROADCASTING FROM MULTIPLE TRANSMITTERS

TECHNICAL FIELD

This disclosure relates to modulating signals that are broadcasted from multiple transmitters.

BACKGROUND

In a cellular communication system, a geographic area is divided into multiple cells 10, 12, 14 as shown in FIG. 1. At the center of each cell 10, a base station 22 is located to serve mobile stations 28, 30 in the cell. Having small, multiple cells help increase coverage and capacity. Each cell can be further divided into sectors 16, 18, 20 by using multiple sectorized antennas to further increase capacity. Typically three sectors per cell are used. (Both conventionally and in this document, the term "sector" applies even when there is only one sector in a cell). In each cell, a base station serves one or more sectors and communicates with multiple mobile stations 28, 30 in the cell. The communication between the base stations 22, 24, 26 and the mobile stations uses analog modulation (such as analog voice) or digital modulation (such as digital voice or digital packet data) to transmit and receive such analog or digital information. The forward link or downlink refers to the direction of communication from the base station to the mobile station. The other direction, i.e., the direction of communication from the mobile to the base station, is called the reverse link or the uplink.

A certain amount of bandwidth (spectrum) is used for such communication between the base station and the mobile station. Two separate spectrums can be allocated for the forward and reverse links as in the frequency division duplexing (FDD) scheme or one spectrum can be multiplexed in time to carry traffic in both directions as in a time division duplexing (TDD) scheme. The minimum unit of bandwidth needed in a cellular wireless system can be referred to as a carrier. As the amount of data traffic is increased, the number of carriers can be increased to provide more capacity. A carrier in a sector can handle up to a certain amount of data traffic, which is referred to as the capacity per carrier per sector or simply capacity. In general, the capacity is different in the forward and in the reverse links.

A wireless communication link between a transmitter and a receiver can be categorized as line-of-sight (LOS) or non-line-of-sight (NLOS). LOS refers to the case when the receiving antenna sees the transmitter directly, i.e., there is a direct path between the two. In NLOS environment, the transmitting and the receiving antennas do not see each other directly, but have multiple different paths over which radio waves can travel due to reflection from objects such as buildings and trees. In a perfect LOS environment, as in free space, there will be no fading. As the number of objects obstructing a direct path between the transmitter and receiver (called "scatterers") increases, fading increases due to interference from multiple paths.

When a transmitter transmits a signal such as a sinusoidal waveform, the resulting received signal is the sum of multiple copies of the same signal. However, each copy can have different amplitude and phase depending on the characteristic of the corresponding path, where amplitude typically decreases as the length of the path increases and the phase increases linearly in path length. In addition, different materials have different reflection and absorption characteristics that effect amplitude and phase differently. Thus, these multiple paths can create multiple copies which constructively and/or destructively interfere with each other at a receiver.

If there are many scatterers that reflect waves, the resulting signal fading can be modeled as Rayleigh fading where the envelope of the received signal follows a complex Gaussian distribution when the transmitted signal is a pure sinusoid. This technique can be useful in modeling a scattering environment in which there are multiple paths without any dominating path because the sum of independent, identically distributed channel gains tend to have a Gaussian-like distribution as there are many paths. This is a good model of many NLOS environment. However, often real-world RF channels have a mixture of LOS and NLOS components. In this case, fading can be modeled as Rician or Nakagami fading. Rician fading models a mixture of LOS and Rayleigh fading paths. Nakagami fading can model fading that is more severe or less severe than Rayleigh fading.

Multi-path fading can also distort the signal if the delay spread is not negligibly small compared to the symbol duration since the fading becomes frequency selective in such an environment. If the delay spread is negligibly small compared to the symbol duration, the fading becomes flat in frequency and is called the flat fading. Various known equalization techniques can be used to remove inter-symbol interference caused by the frequency-selective fading.

Fading can change over time when the transmitter, receiver, or some surrounding objects move. Since the phase of each path can change 360 degrees when the path length changes by the wavelength, the fading can change in a very small scale. For example, fading can change from constructive to destructive when the receiver moves merely a fraction of the wavelength. In 2GHz Personal Communications Service (PCS) band, for example, this corresponds to only 1 or 2 inches. Therefore, in a mobile communication system, the mobility of the terminal can cause the fading characteristics to change quickly. For example, a mobile terminal moving at a pedestrian speed in the PCS band will see the channel fading characteristics change at a rate of a few times a second. However, if the mobile terminal is in a moving vehicle, the channel fading characteristics can change as often as a few hundred times a second. Even when there is no mobility of a terminal, fading can change over time if there are moving objects in the paths. In a mobile communication system, the main cause of time-varying fading is often due to movement of the terminal. For example, if a mobile terminal stops moving during signal transmission, the fading characteristics of the channel can stay constant for a long time. Accordingly, a user will likely experience bad reception if the user's mobile terminal stops moving when it is in deep fade.

In a cellular communication system, a downlink is a broadcast channel whereas the uplink is a multiple access channel from a single sector's perspective since a sector needs to be able to handle multiple mobile terminals. Therefore, to carry user data in the downlink, multiplexing is used. There are many forms of multiplexing, e.g., time-division multiplexing (TDM), frequency-division multiplexing (FDM), orthogonal frequency-multiplexing (OFDM) and code-division multiplexing (CDM). CDM, FDM, and static TDM (i.e., TDM where channel allocation does not change during the entire duration of a call) are typically used for low and fixed rate communication including voice.

Recently many efforts have been made in standardizing high speed data communication in cellular environment, which includes CDMA2000 and wide band CDMA (WCDMA). For example, 1× Evolution Data Only protocol (1×EVDO) described in "CDMA2000 High Rate Packet Data Air Interface Specification," 3GPP2 C.S0024, which is referred to in this document as "3GPP2" and is fully incorporated herein by reference, supports data rates up to 3.1 Mbps in the downlink and 1.8 Mbps in the uplink. When the data rate becomes higher and higher, it becomes more important to use an efficient multiplexing scheme. An often good choice for such high speed applications is TDM because it can maximize burst throughput for each user and thus minimize latency.

Furthermore, when TDM is used, a smart scheduler in the downlink can take advantage of the time varying channel conditions to give higher scheduling priority to users whose channel condition has temporarily improved. The resulting gain from using such a smart scheduler is referred to as a "multi user diversity" gain since the gain becomes higher as there are more users. Multi user diversity gain is described in more detail in "Information capacity and power control in single-cell multi-user communications", R. Knopp and P.A. Humblet, Proceedings of International Conference on Communications (ICC), 1995, Seattle, Wash., pp. 331-335, June 1995.

There are additional benefits in using TDM for downlink. One benefit is that it simplifies resource allocation since the resource is only one dimensional, i.e., time slots. In other multiplexing schemes, resource management can be a two-dimensional problem since code or frequency space also needs to be shared among users. This adds more complexity and tends to be less efficient than TDM. Another benefit of TDM for downlink is that it allows for dynamic scheduling of different types of contents to different users. For example, it can support mixture of unicast and broadcast services, where a unicast packet is received by a single user while a broadcast packet can be received by multiple users simultaneously.

Broadcasting and multicasting (BCMC) have been recently standardized in 3GPP2 and an enhanced version is being standardized in "Enhanced Broadcast and Multicast," 3GPP2, QUALCOMM™. BCMC allows transmitting the same data from one or more sectors to mobiles. This is useful in sending, for example, TV or radio-like programs to a large number of mobile terminals in a large geographic area. In BCMC, no feedback channel is available on the channel condition. Therefore, adaptive modulation is not possible and the modulation needs to be done for the user who has the worst channel condition. Thus, broadcast typically does not perform as well as unicast in terms of total throughput. However, it is possible to improve the broadcast performance by taking advantage of the fact that multiple sectors can transmit the same information. Unlike in the unicast where each sector transmitter transmits different signals thus creating inter-sector interference to all neighbor sectors, transmitting the same signal from multiple sectors does not necessarily create such inter-user interference. However, the signals from multiple sectors are combined at the receiving antenna, thus creating self-interference. This interference can be either constructive or destructive depending on the phase of the signals.

SUMMARY

In downlink broadcasting, transmission of the same signal from multiple transmitters can create patterns of constructive and destructive interference. This can be a severe problem especially between neighboring sectors belonging to the same base station where the antennas belonging to different sectors are closely co-located. The multiple signal paths will destructively interfere in certain areas where the signal strength will be weak. These weak spots are especially problematic for stationary users since their channel conditions usually do not change much over time. Therefore the user can experience a very bad channel condition for a long time. This problem is exacerbated in a strong LOS environment.

In some cases, outer codes such as Reed-Solomon codes are used to correct errors caused by such weakened signal. However, this assumes the fading changes over time and the outer-code spans enough time to cover the time-varying fading. However, this may not be always the case. For example, the fading can change very slowly or may not change much as in a strong LOS case.

Assuming a set of packets that constitute a unit of broadcast transmission are transmitted over multiple blocks of transmission units, it can be beneficial to modulate each block with a random time-varying phase rotation pattern, where the random modulation pattern is independent from sector to sector and the phase rotation is fixed for the duration of each block. The block of transmission also contains a pilot signal, which is also modulated. For such patterns, M-sequences can be used with different offset for different sectors. Each sector is configured with a set of parameters to specify the modulation pattern. The phase rotation can be one of N equally spaced points on the unit circle in the complex plane, where N is an integer$>=2$. When multiple transmitters are transmitting the same broadcast contents, the self-interference pattern will vary randomly over multiple blocks providing diversity. By also employing an outer-code such as Reed-Solomon code, the original set of broadcast packets can be recovered by correcting errors caused by such interference. By making self-interference time varying, the system helps to prevent persistent destructive interference. This is because if the time span of the coding block of the outer code is much greater than the time scale of the modulated pattern, then the performance after the error correction by the outer code is dictated mostly by the average channel condition during the time span. In cases where it is not easy to design a single outer code with a wide time span, we can use multiple outer codes interleaved in time to get similar benefit.

Modulation of a broadcast transmission can also be more generally accomplished using a randomly time-varying complex number, where the random pattern is independent between sectors. Special cases include the complex number being a real number or the complex number being zero or a constant.

By introducing the randomness in broadcast transmission, coverage is typically increased over a system without introduction of time-varying self interference, i.e., more users can receive broadcast packets with higher quality, i.e., less packet errors.

In one aspect, the invention features a method for transmitting a sequence of symbols that includes generating a first sequence of symbols, sending the generated sequence to multiple transmitters, encoding the sequence at each transmitter, multiplying the encoded sequence by a second sequence of symbols at each transmitter, wherein the second sequence of symbols is different at each transmitter, modulating the resulting multiplied sequence, and transmitting the modulated symbols at each transmitter.

Embodiments may include one or more of the following features. The encoding step may include the application outer forward error correction coding technique (e.g., convolutional coding or block coding such as Reed-Solomon coding) to the sequence of symbols. This resulting encoded sequence of symbols may be interleaved and then encoded again by applying an inner forward correction coding technique (e.g., block coding, convolutional coding, turbo coding, or low-density parity-check coding).

Prior to multiplying the first and second sequence, the method may also include applying an inverse Fourier transform function on the encoded data and appending a cyclic prefix to the encoded data.

The second sequence may be a pseudo-random sequence (e.g., an M-sequence) generated at each transmitter. This pseudorandom sequence may be a sequence of complex numbers or a real numbers. In a sequence of complex numbers, each of the complex numbers may have the same amplitude (e.g., an amplitude equal to one). The sequence of complex numbers may be a sequence of N values at N equally spaced points on a unit circle. Each transmitter may generate its second sequence based on pre-configured information (e.g., pseudorandom noise offset for the sector) stored at the transmitter.

The modulation step may include modulating the sequence using quadrature amplitude modulation (QAM), binary phase shift keying (BPSK), or quadrature phase shift keying (QPSK).

The transmitters may transmit the modulated sequence using time division multiplexing to multiplex a second signal with the modulated symbols transmitted at each transmitter. The second signal may be a pilot signal or a unicast signal.

In another aspect, the invention features a method for simultaneously broadcasting blocks of symbols from a first and second transmitter in a cellular system that includes rotating a phase angle of each block of symbols according to a first pattern to produce a first sequence of rotated blocks of symbols and transmitting the first sequence of rotated blocks of symbols from a first transmitter. The method also includes rotating a phase angle of each block of symbols according to a second pattern to produce a second sequence of rotated blocks of symbols, and transmitting the second sequence of rotated blocks of symbols from the second transmitter at the same time the first sequence is being transmitted from the first transmitter.

Embodiments may include one or more of the following features. The first and second patterns may each comprise a series of complex numbers that vary with time. The first and second patterns may be each a series of pseudorandom numbers. The step of rotating a phase angle may include multiplying a block of data with the complex number.

In another aspect, the invention features a transmitter for broadcasting a sequence of symbols in a cellular network comprising multiple transmitters. The transmitter includes an encoder for encoding the sequence of symbols, a multiplier configured to multiply the encoded sequence by a second sequence of symbols (where the second sequence of symbols is determined according to a pattern that is different from patterns used by other transmitters in the network), a modulator configured to modulate the multiplied sequence, and an antenna for transmitting the modulated sequence.

Various embodiments may include one or more of the following features. The encoder may include an outer encoder configured to apply an outer forward error correction code to the sequence of symbols and an inner encoder configured to apply an inner forward error correction code to the sequence of symbols. The apparatus may also include an interleaver circuit configured to interleave the encoded sequence of symbols.

The details of one or more embodiments of the invention are set forth in the accompanying drawings and the description below. Other features, objects, and advantages of the invention will be apparent from the description and drawings, and from the claims.

DETAILED DESCRIPTION

Figure 6:
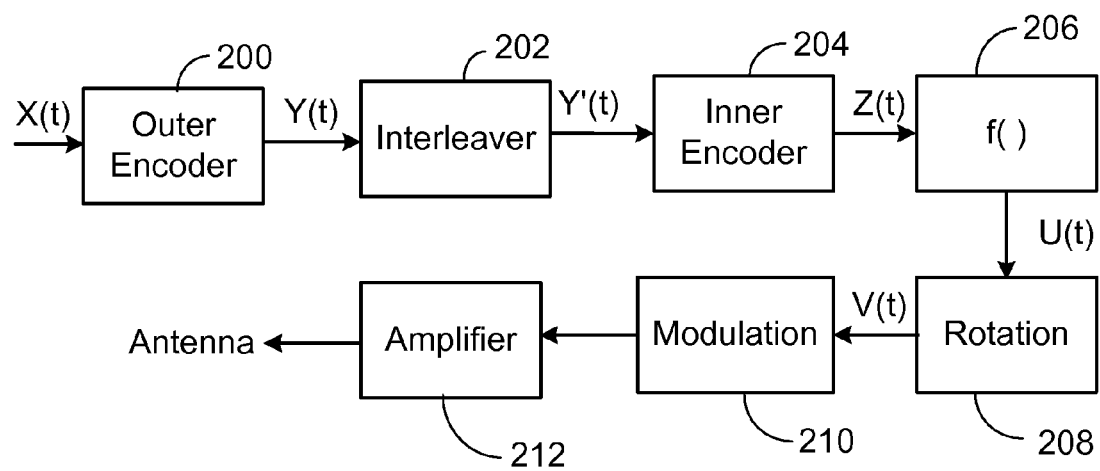
FIG. 6 is a diagram of functional components of a transmitter.
Figure 7:
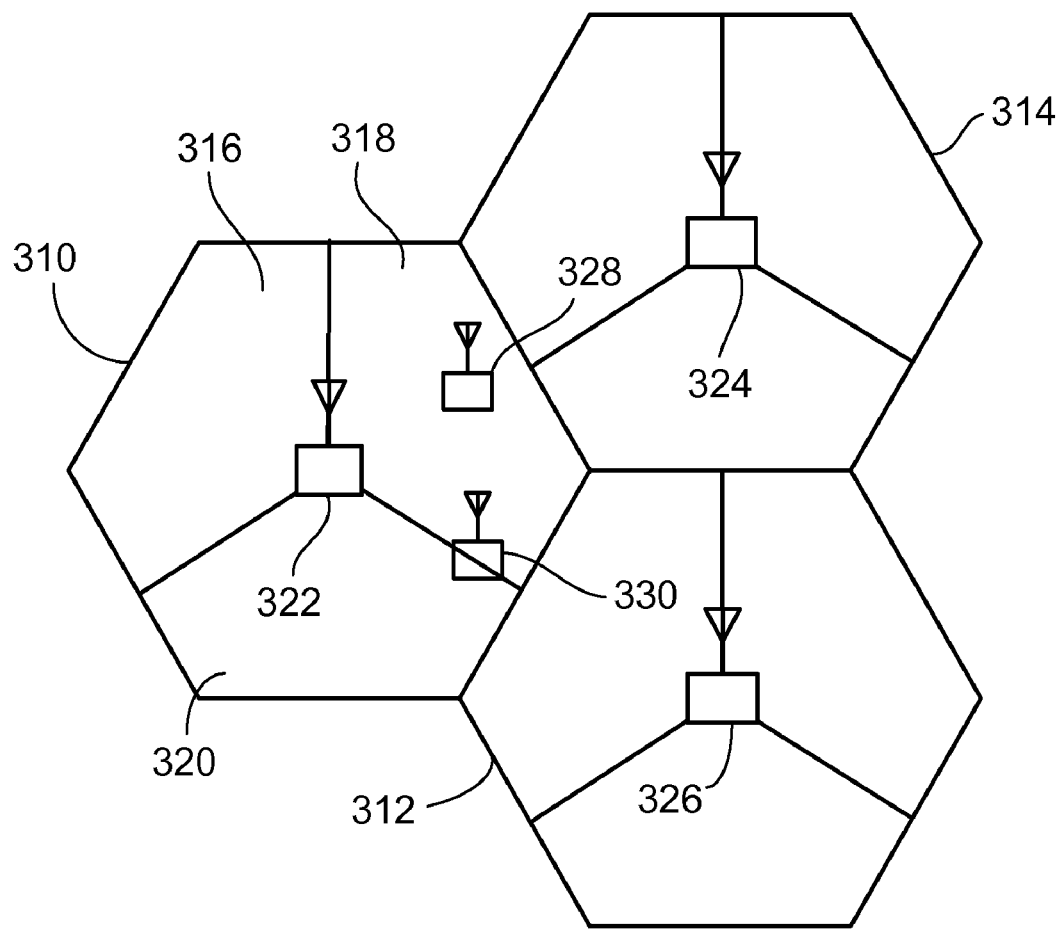
FIG. 7 is a diagram of an example of a cellular system in accordance with or more embodiments of the invention and including, e.g., FIG. 6.

In a cellular communication system, a geographic area is divided into multiple cells 310, 312, 314 as shown in FIG. 7. FIG. 7 is a diagram of an example of a cellular system in accordance with or more embodiments of the invention and including, e.g., FIG. 6. At the center of each cell 310, a base station 322 is located to serve mobile stations 328, 330 in the cell. Having small, multiple cells help increase coverage and capacity. Each cell can be further divided into sectors 316, 318, 320 by using multiple sectorized antennas to further increase capacity. Typically three sectors per cell are used. (Both conventionally and in this document, the term "sector" applies even when there is only one sector in a cell). In each cell, a base station serves one or more sectors and communicates with multiple mobile stations 328, 330 in the cell. The communication between the base stations 322, 324, 326 and the mobile stations uses analog modulation (such as analog voice) or digital modulation (such as digital voice or digital packet data) to transmit and receive such analog or digital information. The forward link or downlink refers to the direction of communication from the base station to the mobile station. The other direction, i.e., the direction of communication from the mobile to the base station, is called the reverse link or the uplink.

Figure 1:
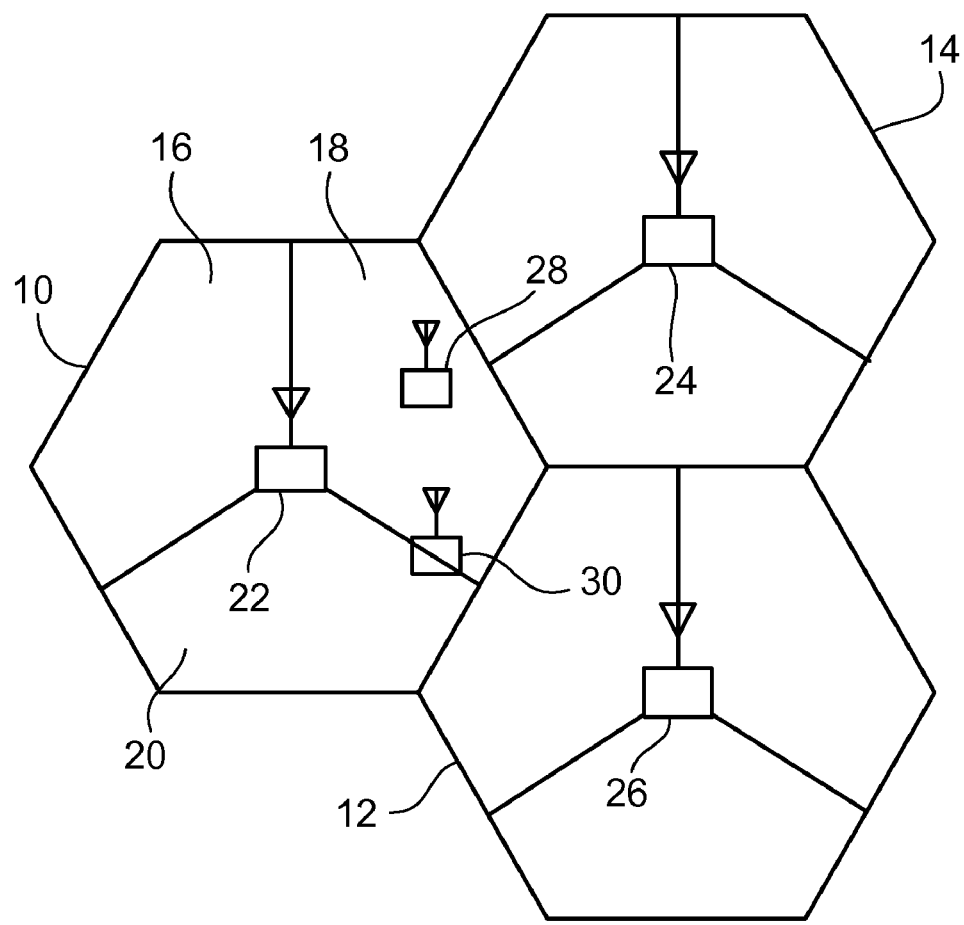
FIG. 1 is a diagram of an example of a cellular system.
Figure 2:
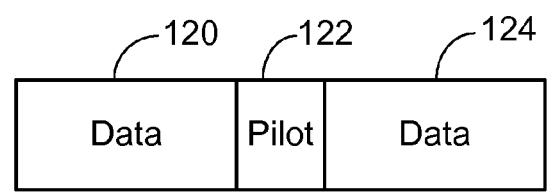
FIG. 2 is a diagram of a TDM structure within a time slot.

In a TDM scheme, a time slot is the minimum transmission unit for data. For various purposes, it is sometimes desirable to transmit other information in addition to payload data in the same time slot. For example, a pilot signal can be transmitted to aid the mobile's estimation of the channel. FIG. 2 shows an example of TDM structure within a time slot, where payload data 120, 124 and pilot data 122 are time-division multiplexed within the same time slot. As shown, the payload data is spread into two parts 120 and 124 in this example.

Figure 3:
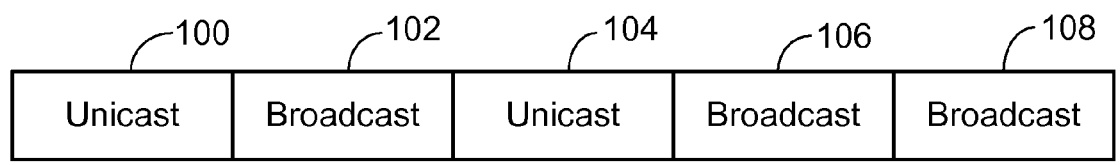
FIG. 3 is a diagram of unicast and broadcast data that have been time-division multiplexed.

Referring to FIG. 3, a series of five time slots includes some time slots that are used for unicasting data 100, 104 and others that are used for transmitting broadcast data 102, 106, 108. In one implementation, a system modulates each block of broadcast data 102, 106, 108 with a random time-varying phase rotation, where different random modulation patterns are used among the sectors in the system and the phase rotation is fixed for the duration of each block.

Referring to FIG. 6, a transmitter includes an outer encoder 200, an interleaver 202, an inner encoder 204, a mapping function f( ) 206, a rotation function 208, a modulator 210 and an amplifier 212. A broadcast signal, X(t) (which is a sequence of T broadcast symbols, where t is the time index and where it is assumed that t is between 0 and T−1) is encoded by the outer encoder 200. In one particular implementation, block codes such as Reed-Solomon codes are used by the outer encoder to encode X(t). The purpose of the outer coder is to correct errors not corrected by the inner coding 204. For example, when there is time-varying fading some symbols are prone to more errors. Outer coding can correct some of the errors. It should be noted that not all T symbols need to be encoded together. In one implementation, T incoming symbols are divided into K equal-sized subsets and outer encoding is done for each subset. For example, {X(0), . . . X(T/K−1)} is first encoded by the outer coder and then {X(T/K), . . . ,X(2*T/K−1)} is encoded. In general, the subsets can have different sizes. The output of the outer coder, Y(t) now has T' symbols, where T'>=T. T'−T additional symbols are added by the outer encoder to give redundancy. Thus, the first subset of input symbols {X(0), . . . X(T/K−1)} is encoded to {Y(0), . . . ,Y(T'/K−1)} and the second subset of input symbols {X(T/K), . . . X(2*T/K−1)} is encoded to {Y(T'), . . . ,Y(2*T'/K−1)} and so on. For simplicity, this document will denote T'/K as A.

The outer encoder's output, Y(t), is interleaved by the interleaver 202. The interleaver 202 reorders Y(t) before applying the inner encoder 204 and generates output Y'(t). In one implementation, interleaving is done such that no symbols belonging to the same outer-encoding block belong to the same block of the inner coding.

The inner encoder 204 then encodes groups of symbols, where each group has L symbols and where L is a fraction of K. For example, if L=K/2, then the inner encoder first encodes {Y(0), Y(A), . . . , Y((L−1)*A)} and produces {Z(0), Z(1), . . . , Z(L'−1)}, where L'>L and L'−L is the redundancy introduced by the inner coder. In one implementation, the inner-encoder employs convolutional or turbo codes, which encodes {Y(1), Y(A+1), . . . , Y((L−1)*A+1)} as {Z(L'), Z(L'+1), . . . ,Z(2*L'−1)}. Encoding is continued until {Y(A−1), . . . Y((L−1)*A+A−1)} is encoded. After encoding the first group, the inner encoder encodes the next group to encode {Y(T'/2), Y(T'/2+A), . . . , Y(T'/2+(L−1)*A)} as {Z(T'/2), Z(T'), . . . , Z((T'−1)*(L−1))} and so on. The output of the inner encoder, Z(t), has now B=L'*T'/L symbols.

Figure 4:
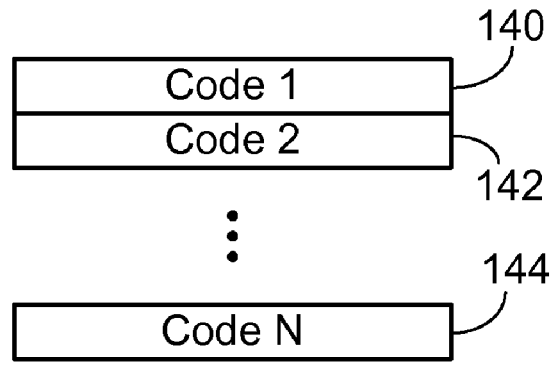
FIG. 4 is a diagram of a CDM symbol within a data burst.

The output symbols Z(t) are applied to a mapping function f( ) 206 that maps {Z(0), . . . , Z(B−1)} into {U(0), . . . , U(C−1)}, where C is the number of symbols in U(t). The mapping function f( ) can be an interleaver, an OFDM modulator, or a combination of the two. In another implementation other invertible mapping functions, such as a Walsh-Hadamard transform function, are used in lieu of OFDM. As shown in FIG. 4, a CDM symbol composed of N codes can be transmitted within a data burst, where a data burst can contain multiple CDM symbols. If OFDM is used, then it is done such that the input sequence Z(t) is divided into one or more subsets of equal size and the inverse fast Fourier transform (FFT) is performed for each subset. Cyclic prefix is then appended for each subset. The OFDM symbols are serialized and become U(t). Due to cyclic prefix, the number of output symbols is generally greater than that of the input symbols. Interleaving can be applied either before or after OFDM (or both) for randomization. When OFDM is used, some frequency bins can be used to transmit known pilot signals to enable the receiver estimate the channel. U(t) is then divided into D groups of equal size and each group of symbols are transmitted within a single time slot. Therefore, it takes total of D time slots to transmit the original T input symbols. It is preferable to set D to have a value of 10 or greater in order for error correction by the outer coder work properly.

Figure 5:
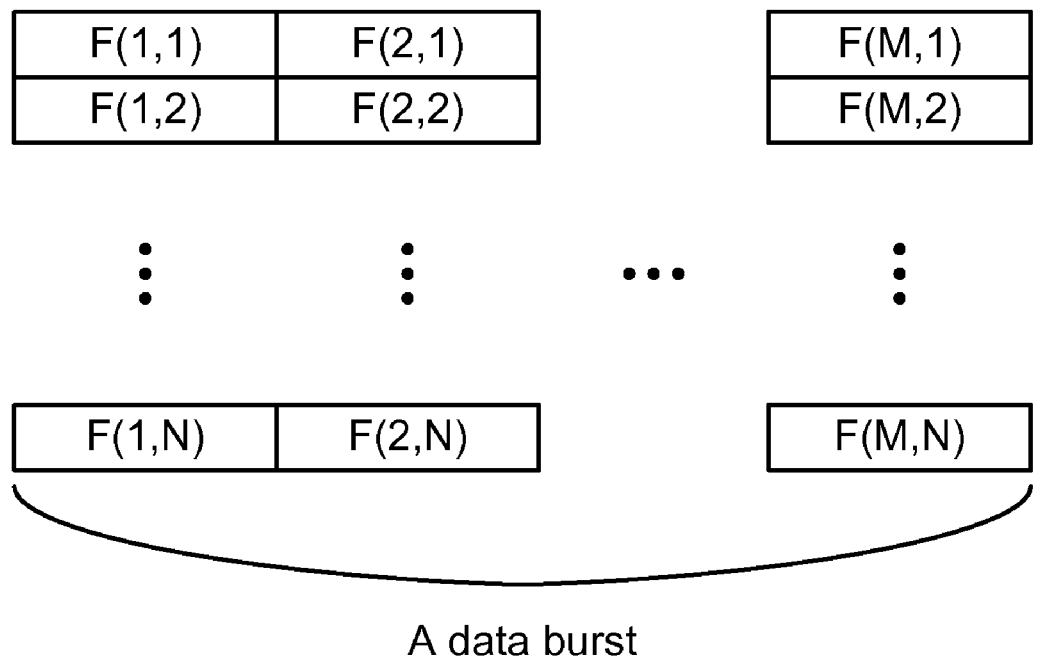
FIG. 5 is a diagram of an OFDM structure for a data burst.

FIG. 5 illustrates how OFDM symbols can be organized in a data burst within a time slot, where {F(1,1), . . . ,F(1,N)} are the output of the first inverse fast Fourier transform (IFFT) block and {F(2,1), . . . ,F(2,N)} are the output of the second IFFT block, and so on. Between two IFFT blocks, cyclic prefix can be inserted (not shown in FIG. 5).

The description so far applied to one sector. When multiple sectors broadcast the same data simultaneously, they all receive the same input X(t) from a single source and perform the same operations including outer coding 200, interleaving 202, inner encoding 204, and the mapping f( ) 206. However, each sector uses a different pattern for rotating 208 the sequence of symbols in each time slot, where the pattern is stored in each sector. In one embodiment, each sector can use a pre-stored information to generate the pattern. For example, pseudorandom noise offset (PN offset) of CDMA can be used as the pre-stored information. In one implementation, rotation is done per time slot, i.e., V(t)=U(t)*R(t), where R(t) is a complex number with the unit amplitude and R(t) is the same for all symbols in a time slot. More generally, rotation can be done per group of time slots. The sequence {R(t)|t>=0} is referred to as the rotation pattern. In one implementation, each sector uses a unique pattern for R(t). Other implementations may reuse one or more of the patterns if the two sectors are separated far enough apart that it is unlikely that a mobile terminal will receive signals from both of them simultaneously.

The rotated symbols V(t) are modulated 210 and amplified 212 and then transmitted through an antenna. Modulation 210 can be performed using QAM, BPSK, or QPSK. If the data does not contain a pilot signal, a pilot signal may be time division multiplexed with the data (as shown in FIG. 2) and rotated in the same way as the data. In another embodiment, the pilot signal may be frequency division multiplexed with data or it can be sent using a group of OFDM symbols.

In one embodiment, the rotation angles are quantized. For example, quantization can be one of the points in 4-PSK (phase shift keying), or 8-PSK. More generally, they can be a set of points equally spaced on the unit circle in the complex plane. For the rotation pattern, a pseudo-random sequence, such as a maximum length sequence (M-sequence), can be used to generate a sequence of random numbers, i.e., t bits are generated by the random number generator in each time slot and they choose one of $2^t$ points in $2^t$-PSK modulation points. If some time slots are not used for broadcast, then random number generation can be temporarily suspended during the time slot. Different sectors can use the same M-sequence with different time offset.

When a mobile terminal receives the broadcast signal from multiple sectors, its received signal is the sum of all transmitted signals (each signal experiences different channel gain). The mobile terminal does not know which signal is from which sector, but it only sees an aggregated signal. By using the aggregated pilot signal received at the antenna, which is the sum of multiple received pilot signals, the mobile terminal estimates the channel in each time slot. Using the channel estimation information provided by the pilot, the mobile terminal can coherently detect data symbols in each time slot. Rotation does not affect the mobile terminal's detection operation since the rotation stays the same for the whole duration of the time slot.

While the above example uses complex number of unit amplitude to rotate the symbols, it should be understood that any sequence of complex numbers can be used to rotate the sequence of the symbols in each time slot.

By randomly rotating the signal, a mobile terminal is likely to see more fluctuation in the combined received signal, which can be better than having a poor signal quality for a long time (e.g., in the case of a stationary terminal) due to destructive interference. Moreover, since outer coding is used, errors due to such fluctuation in the combined received signal can be corrected using known techniques. By modulating broadcast signals differently in different transmitters, a system achieves a more even user throughput than in a system without such modulation. In broadcast transmissions, where the encoding rate is governed by the user who has the worst channel condition, a more even user throughput can be particularly advantageous.

A number of embodiments of the invention have been described. Nevertheless, it will be understood that various modifications may be made without departing from the spirit and scope of the invention, and, accordingly, other embodiments are within the scope of the following claims.

What is claimed is:

1. A method comprising:
generating a first sequence of symbols;
sending the first sequence to multiple transmitters;
encoding the first sequence to produce an encoded sequence at each transmitter;
multiplying the encoded sequence at each transmitter by a second sequence of elements to produce a multiplied sequence, wherein the second sequence of elements is different at each transmitter, and wherein each element in the second sequence of elements corresponds to, and stays constant for a duration of, one or more time slots;
modulating the multiplied sequence at each transmitter to produce a modulated sequence of symbols; and
transmitting the modulated sequence of symbols at each transmitter in at least the one or more time slots.

2. The method of claim 1, wherein the encoding comprises:
applying an outer forward error correction coding to the first sequence.

3. The method of claim 2, wherein the encoding further comprises:
applying an inner forward error correction coding to the first sequence.

4. The method of claim 2, wherein the outer forward error correction coding comprises a block coding.

5. The method of claim 2, wherein the outer forward error correction coding comprises a convolutional coding.

6. The method of claim 2, further comprising:
interleaving the encoded sequence.

7. The method of claim 3, wherein the inner forward error correction coding comprises one or more of the following: a block coding, a convolutional coding, a turbo coding, or a low-density parity-check coding.

8. The method of claim 4, wherein the block coding comprises a Reed-Solomon coding.

9. The method of claim 1, further comprising:
prior to multiplying the encoded sequence, applying an inverse Fourier transform to the encoded data.

10. The method of claim 9, further comprising:
appending a cyclic prefix to the encoded data.

11. The method of claim 1, wherein the second sequence of elements comprises a pseudo-random sequence of elements generated at each transmitter.

12. The method of claim 11, wherein each element of the pseudo-random sequence is a complex number.

13. The method of claim 11, wherein each element of the pseudo-random sequence is a real number.

14. The method of claim 11, wherein the pseudo-random sequence comprises an M-sequence.

15. The method of claim 12, wherein complex numbers in the pseudo-random sequence have a same amplitude.

16. The method of claim 12, wherein the complex number has one of N values in N equally spaced points on a unit circle.

17. The method of claim 15, wherein the amplitude is one.

18. The method of claim 1, further comprising:
generating the second sequence of elements at each transmitter using pre-configured information stored at each transmitter.

19. The method of claim 18, wherein the pre-configured information comprises a pseudorandom noise offset, the pseudorandom noise offset being different at each transmitter.

20. The method of claim 1, wherein modulating comprises using quadrature amplitude modulation.

21. The method of claim 1, wherein modulating comprises using binary phase shift keying.

22. The method of claim 1, wherein modulating comprises quadrature phase shift keying.

23. The method of claim 1, wherein each transmitter transmits using time division multiplexing to multiplex a second signal with the modulated sequence transmitted at each transmitter.

24. The method of claim 23, wherein the second signal comprises a pilot signal.

25. The method of claim 23, wherein the second signal comprises a unicast signal.

26. The method of claim 1, wherein the encoded sequence comprises encoded sequences of symbols, and wherein multiplying the encoded sequence further comprises:
rotating a phase angle of each of the encoded sequences of symbols within the encoded sequence, wherein for each of the encoded sequences of symbols a rotation of the phase angle is fixed for the duration of the one or more time slots.

27. A method for broadcasting blocks of symbols from a first transmitter and a second transmitter in a cellular system, the method comprising:
rotating a phase angle of each block of symbols according to a first pattern to produce a first sequence of rotated blocks of symbols, wherein for each block of symbols, a rotation of the phase angle according to the first pattern is fixed for a duration of the block of symbols;
transmitting the first sequence of rotated blocks of symbols from a first transmitter;
rotating a phase angle of each block of symbols according to a second pattern to produce a second sequence of rotated blocks of symbols, wherein for each block of symbols, a rotation of the phase angle according to the second pattern is fixed for a duration of the block of symbols; and
transmitting the second sequence of rotated blocks of symbols from the second transmitter.

28. The method of claim 27, wherein the first pattern comprises a series of complex numbers that vary with time, wherein each complex number in the series is used to rotate the phase angle of a corresponding respective block of symbols of the blocks of symbols.

29. The method of claim 27, wherein the first pattern comprises a series of pseudorandom numbers, wherein each pseudorandom number in the series is used to rotate the phase angle of a corresponding respective block of symbols of the blocks of symbols.

30. The method of claim 27, wherein rotating a phase angle comprises:
multiplying each block of symbols with a complex number, wherein the complex number is determined according to the first or second pattern.

31. The method of claim 27, further comprising:
prior to transmitting the first and second sequences of rotated blocks of symbols, modulating the first and second sequences of rotated blocks of symbols.

32. The method of claim 27, further comprising:
encoding symbols in each block of symbols using a first encoder to produce encode symbols.

33. The method of claim 32, wherein encoding symbols occurs prior to rotating the phase angle.

34. The method of claim 32, wherein the first encoder comprises an outer encoder.

35. The method of claim 32, further comprising:
interleaving the encoded symbols to produce interleaved encoded symbols.

36. The method of claim 35, further comprising:
encoding the interleaved encoded symbols using a second encoder.

37. A transmitter for broadcasting a modulated sequence of symbols in a cellular network comprising multiple transmitters, the transmitter comprising:
an encoder configured to encode a first sequence of symbols to produce an encoded sequence;
a multiplier configured to multiply the encoded sequence by a second sequence of elements to produce a multiplied sequence, wherein the second sequence of elements is determined according to a pattern that is different from patterns used by other transmitters in the cellular network, and wherein each element in the second sequence of elements corresponds to, and stays constant for a duration of, one or more time slots;
a modulator configured to modulate the multiplied sequence to produce the modulated sequence of symbols; and
an antenna for transmitting the modulated sequence of symbols in at least the one or more time slots.

38. The transmitter of claim 37, wherein the encoder comprises:
an outer encoder configured to apply an outer forward error correction code to the sequence of symbols.

39. The transmitter of claim 38, wherein the encoder further comprises:
an inner encoder configured to apply an inner forward error correction code to the sequence of symbols.

40. The transmitter of claim 37, further comprising:
an interleaver circuit configured to interleave the encoded sequence of symbols.

41. The transmitter of claim 37, wherein the encoded sequence comprises encoded sequences of symbols, and wherein the multiplier is configured to multiply the encoded sequence by rotating a phase angle of each of the encoded sequences of symbols within the encoded sequence, wherein for each of the encoded sequences of symbols a rotation of the phase angle is fixed for the duration of the one or more time slots.

* * * * *